April 2, 1935.  N. M. STANLEY  1,996,442

METHOD OF MAKING MULTIFOCAL LENS SEGMENTS

Filed April 24, 1933  2 Sheets-Sheet 1

Inventor
NATHAN M. STANLEY,
By
Attorneys

April 2, 1935.　　　N. M. STANLEY　　　1,996,442

METHOD OF MAKING MULTIFOCAL LENS SEGMENTS

Filed April 24, 1933　　2 Sheets-Sheet 2

Inventor
NATHAN M. STANLEY,
BY
Attorneys

Patented Apr. 2, 1935

1,996,442

UNITED STATES PATENT OFFICE 1,996,442

METHOD OF MAKING MULTIFOCAL LENS SEGMENTS

Nathan M. Stanley, Dayton, Ohio, assignor to The Univis Corporation, Dayton, Ohio, a corporation of Delaware Application April 24, 1933, Serial No. 667,577

4 Claims. (Cl. 49—82.1)

This invention relates to multifocal lenses and, in particular, to segments for multifocal lenses and methods of making them.

One object of my invention is to provide a method of making a multifocal lens segment of the so-called compound button type wherein the necessity of finishing the adjoining edges or of clamping them together, is eliminated.

Another object is to provide a method of making such a segment which shall be inexpensive, simple and efficient, and which will result in an improved product well adapted to manufacture by quantity production methods.

Another object is to provide a method of making such a segment wherein the junction between two adjoining parts will have a light-retarding layer therebetween to prevent the reflection of light from the inter-edge between the parts having different indices of refraction, or to prevent the production of color fringes near said inter-edge.

Another object is to provide such a light-retarding layer which will be translucent rather than completely transparent or completely opaque.

Another object is to provide such a light-retarding layer which is of a different chemical composition from that of the other parts of the segment.

Another object is to provide a method of making such a segment wherein the light-retarding layer will be produced by chemical attack on one or more of the segment parts.

Other objects will be apparent from the following specification taken in connection with the accompanying drawings and appended claims.

Figure 1:
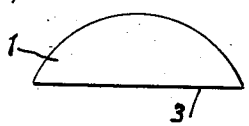
Figure 1 is a plan view of one part, preferably low index glass, used in making the segment of my invention.
Figure 2:
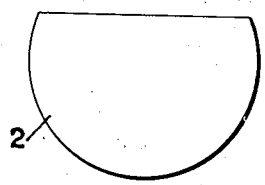
Figure 2 is a plan view of another part, preferably of high index glass, used in making such a segment.
Figure 3:
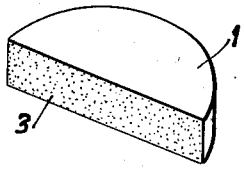
Figure 3 is a perspective view showing a roughened edge formed on one of the segment parts.
Figure 4:
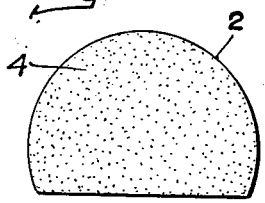
Figure 4 is a bottom view of the lower surface of one of the segment parts, showing the roughened treatment which may be given thereto in order that the inter-edge between the segment parts in the final product shall be of uniform texture.

Referring to the drawings in detail, 1 is a piece of transparent material for a segment, preferably of low index crown glass. (Figure 1). 2 is a corresponding segment piece of high index glass, preferably of flint or barium crown glass. (Figure 2). In carrying out my invention, it is preferable to roughen the edge 3 of the crown piece 1 to prevent light reflections at the inter-edge between the segment portions, as the low index piece usually has a higher melting point than the high index piece 2. It is also advisable, although not entirely necessary, to roughen the bottom surface 4 of the high index portion 2, as shown in Figure 4.

Figure 5:
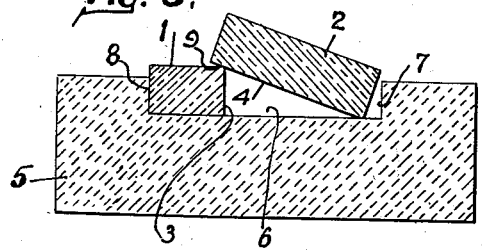
Figure 5 is a central vertical section through a fusing block, showing the segment parts in position for fusing.

The pieces thus prepared are assembled in the manner shown in Figure 5, using a heat resisting holder 5, this holder or fusing block being of any suitable material which will endure the high temperatures without disintegration or warping. Carborundum has been found suitable, also porcelain, fire clay and certain metals. The fusing block 5 preferably contains a recess 6 or projections 7 and 8 which serve to keep the segment parts from slipping. The low index portion is placed against one of these projections or side walls 8 and the high index portion is tilted with one edge supported against the other projection or side wall 7, the opposite edge being supported, as at 9, on the upper edge of the low index portion 1. The overlap at 9 of the high index portion 2 upon the low index portion 1 may be very small, an overlap of one or two millimeters usually being ample. If the surface 4 of the high index portion has been uniformly roughened, as in Figure 4, it is placed downward toward the fusing block, as in Figure 5.

With the segment parts in the position shown in Figure 5, the assembly is placed in a suitable furnace, and the temperature raised to the fusing point. The furnace may be of the stationary type wherein the fusing block remains in one position throughout the entire fusing operation, or it may be of the movable type wherein the fusing block and its contents move gradually through the furnace under the influence of conveying mechanism.

Figure 6:
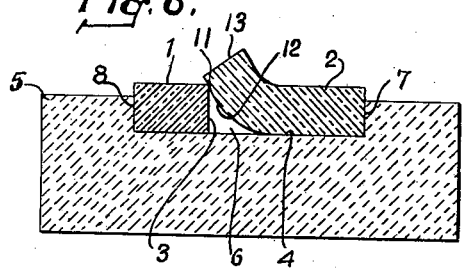
Figure 6 is a view similar to Figure 5 with the fusing partly accomplished.
Figure 7:
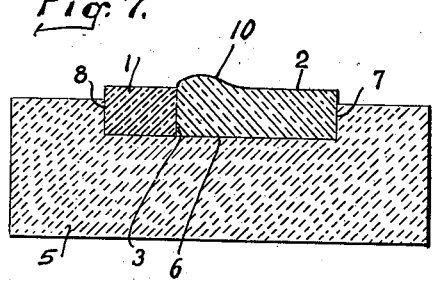
Figure 7 is a view similar to Figure 5 with the fusing completed.

When the temperature reaches the softening point of the high index glass, assumed to be also the lower melting glass, the latter begins to collapse as shown in Figure 6. During this stage of the method, the low melting portion 2 first assumes the shape of the letter I, then collapses into the form of a letter J, and finally assumes the form somewhat like a letter L with its stubbed lower bar pointed upward, as shown in Figure 7. Under the action of the heat, the stubbed bar disappears in a rounded ridge 10 which passes across the segment, following the direction of the inter-edge 3. Accordingly, as the low melting part 2 collapses (Figure 6), the portion 11—12 thereof comes into contact with the edge 3 of the higher melting portion, whereas the end 13 finally assumes a substantially horizontal position and becomes the rounded ridge 10.

The temperature necessary to produce this welding of the button parts depends entirely on the particular materials used. For the average flint glass portion superposed on a crown glass portion, about 650° C. or 1200° F. is a good average temperature. For a barium crown segment portion on a crown segment portion, however, the temperature must be raised considerably, and about 750° C. or 1380° F. is suitable for one kind of this glass. During the fusion, it is advisable to dust the fusing block with powdered mica or an analogous material in order to prevent the button parts from sticking to the fusing block. After fusion has taken place, the heat is turned off and the button allowed to anneal in a closed furnace for a period of ten hours or more, as conditions demand, in order that all strain will be eliminated. In a furnace of the moving type, the button parts will pass through the annealing stage in a period several hours shorter in length.

Figure 11:
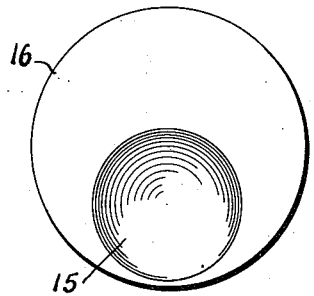
Figure 11 is a plan view of a major blank showing a countersink for receiving a segment.
Figure 12:
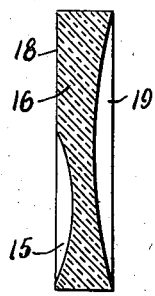
Figure 12 is a central vertical section through the major blank shown in Figure 11.
Figure 13:
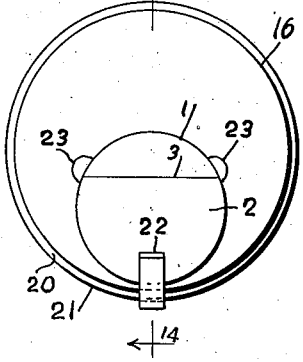
Figure 13 is a plan view of the major blank shown in Figure 11, in position on a fusing block, with the segment or button shown in Figure 8 held in position over the countersink.
Figure 14:
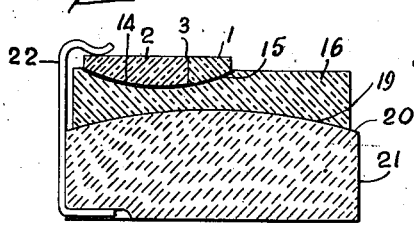
Figure 14 is a central vertical section along the line 14—14 of Figure 13.
Figure 15:
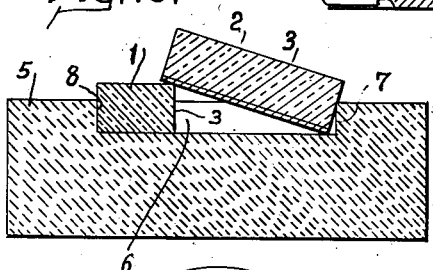
Figure 15 is a central vertical section similar to that of Figure 5, but showing one of the segment parts with a layer of light-diffusing material on the lower surface thereof.
Figure 18:
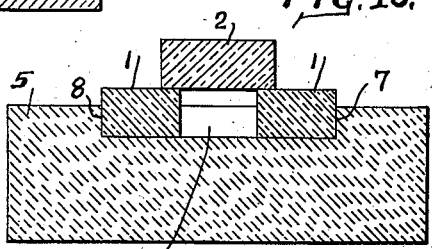
Figure 18 is a central vertical section through a fusing block containing a modified arrangement of segment parts.

The rough button thus made is now surfaced on both sides. One surface 14 has a curvature suitable for fusing into a countersink 15 in a major blank 16 (Figure 11), this major blank being preferably of low index material. The other side 17 of the button may be left rough, or preferably finished with a suitable curve which will allow the segment to be inspected for defects by looking through it. The curvature of the countersink 15 in the major blank 16 is determined by the particular reading addition which it is desired to create on the given base curve 18 (Figure 12). This curvature is readily determined by formulæ well known to those skilled in the art. The opposite side 19 of the major blank 16 is given a surface whose curvature corresponds to the curvature on the upper surface 20 of a second fusing block 21 (Figure 14). It is important that the curves 19 and 20 be very closely in correspondence, otherwise the blank 16 may warp slightly causing a distortion of the countersink and a consequent damage to the optical quality of the lens. The second fusing block may be made of the same material as the first fusing block. The segment may be held in position over the countersink 15 by a clip 22 and by guiding spots 23. (Figure 13). The clip 22 may be of any suitable metal and forms no part of this invention, where as the spots 23 may be placed on the lens in the form of drops of paste which will become a solid mass under the action of the heat. Alternatively, pieces of cardboard soaked in sodium silicate have been used for the same purpose, that of preventing the segment from slipping sidewise. The clip 22 keeps the segment slightly tilted or separated from the countersink 15 by an air space of varying width. The result is that when the assembly is placed in a stationary or moving furnace and the temperature raised to the fusing point, the segment slowly collapses and becomes joined to the countersink 15, driving the air out ahead of it as it collapses into the countersink 15. As before, the proper fusing temperature depends on the materials used, a temperature of about 700° C. or 1290° F. being suitable for flint glass and about 750° C. or 1380° F. for barium crown glass. It is, of course, assumed that the contacting surfaces 14 of the button, and 15 of the countersink have been cleaned in a suitable manner prior to fusing, such as by using alcohol, weak acids or alkalies. The blank thus made is annealed for a time and in a manner similar to the annealing period for the segment fusion previously described. Prior to fusion, the surface 20 of the fusing block 21 is preferably dusted with powdered mica or other similar substance to prevent sticking.

Figure 16:
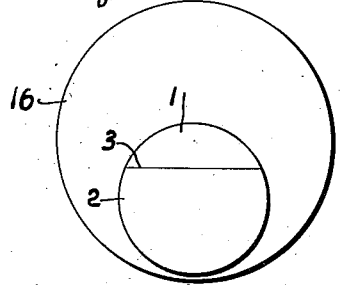
Figure 16 is a plan view of the completed rough blank, with the segment fused into the countersink.
Figure 17:
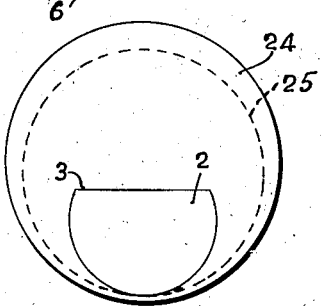
Figure 17 is a plan view of the blank in Figure 16 after the segment side has been ground and polished, showing the outline of a finished lens in dotted lines.

The rough blank thus formed (Figure 16) is now surfaced on its segment side 24 with the curvature of the particular base curve 18 chosen to give the desired addition. The semi-finished blank thus formed is sold in that form to the optician who makes it into a finished lens by surfacing the opposite side with a curvature suitable for the individual prescription of the wearer. The finished lens of a suitable size and shape is then cut out, as shown by the dotted lines 25 in Figure 17, and, after being edge-ground, is mounted in the ordinary manner well known in the art.

The inter-edge, or the edge along which the two portions 1 and 2 are joined, may be treated in any one of several different ways, but variously treating the edge 3 of the high melting portion and the surface 11—12 of the low melting portion (Figure 6), according as whether or not it is desired to remove reflections along this interedge. If such reflections are not to be eliminated, the edge 3 may be ground and polished and the bottom surface 4 of the low melting portion likewise ground and polished. A partial reduction of the inter-edge reflections will be obtained if the edge 3 is ground but not polished, and this effect will be increased if the bottom surface 4, or at least the portion 11—12 thereof, be also ground but not polished. Under this treatment the inter-edge, after fusing, will present a somewhat speckled appearance, due to the granulated effect from the frosted surface produced by the grinding.

Due to the fact that the edge 3 and the portion 11—12 of the surface 4 are not in contact during the early part of the fusion, these surfaces may become fire polished to some extent before fusion takes place. If a higher degree of reflection prevention is desired, I have found several means of accomplishing this purpose.

By one modification of my invention, I find that a light-retarding layer may be inserted along the inter-edge by coating the edge 3 and/or the portion 11—12 of the surface 4 with a substance which will sufficiently resist the action of the fusing heat to create a diffusion of the light rays which would otherwise be regularly reflected off the inter-edge. Such substance must likewise be of such a character that it will accomplish this light diffusion and yet permit the segment portions to unite completely. As an example of such a substance which will permit fusion and yet produce such a light-diffusing layer, I find that an ordinary red lead pencil may be rubbed over the areas to be joined prior to fusion: the unpolished condition of these areas permits the adhesion of the pencil material more readily than if these areas were polished. Such pencils are composed principally of a wax in which red lead ($Pb_3O_4$) is dissolved to provide the red pigment. When the glasses are raised to the high temperature of fusing, the red lead breaks down into lead monoxide (PbO) which is of a pale yellowish white color and which provides the light diffusing layer. It is important not to use too waxy a pencil, as an excess of stearin may prevent proper fusion and cohesion of the parts.

It is not intended to limit the invention to this single substance, as it is found that many substances which will endure the high heat of fusion will provide a similar light-diffusing layer. The layer thus produced is of different chemical composition than the adjacent glasses, as distinguished from a light-producing inter-edge formed by leaving the contacting edges ground but not polished before fusion: the ground surface of the glass in that case is obviously of the same chemical composition as the glass on which it is located.

Figure 8:
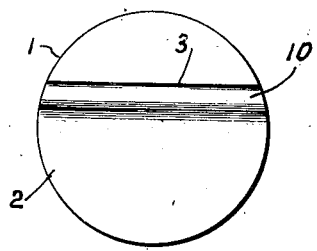
Figure 8 is a plan view of the segment or button after fusing, as shown in Figure 7.
Figure 9:
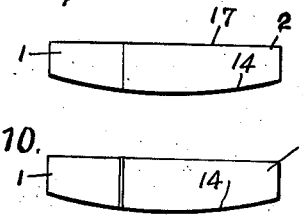
Figure 9 is a side elevation of the completed segment shown in rough form in Figure 8 after surfacing.
Figure 10:
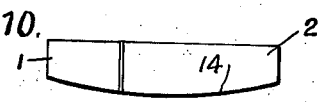
Figure 10 is a side elevation of a completed segment similar to that shown in Figure 8, but with a light-diffusing layer between the segment parts.

It will be understood that my invention is not limited to the production of a segment with a straight line between the portions. The edge 3 of the higher melting portion may be given an arcuate outline and the benefits of my invention equally afforded. In producing such a segment with an arcuate inter-edge, the projecting ridge 10 will obviously become arcuate in shape rather than a straight ridge across the surface of the segment as shown in Figure 8.

It will be understood that I desire to comprehend within my invention such modifications as may be necessary to adapt it to varying conditions and uses.

Having thus fully described my invention, what I claim as new and desire to secure by Letters Patent is:

1. A method of making a multifocal lens segment, including supporting one end of one segment portion upon the upper corner of another segment portion, and applying heat to cause said upper segment portion to buckle and become united with said lower segment portion along an edge only thereof.

2. A method of making a multifocal lens segment, including providing one segment portion with a roughened bottom surface, partially superposing this portion upon another segment portion with said roughened surface downward, and applying sufficient heat to cause said upper portion to buckle and become united to said lower segment portion along an edge thereof.

3. A method of making a multifocal lens segment, including placing one segment portion on a refractory support, applying a coating of light-diffusing material to one surface of another segment portion, superposing said second segment portion in slightly overlapping relationship upon said first segment portion, and applying heat to cause said portions to become joined along an edge of one of said portions with said light-diffusing layer between said portions so-joined.

4. A method of making a multifocal lens segment, including placing a higher melting segment portion on a refractory support, applying a coating of light-diffusing material to one surface of a lower melting segment portion, superposing said lower melting portion upon said higher melting portion in slightly overlapping relationship, and applying heat to cause said portions to become joined along an edge of one of said portions with said light-diffusing layer between said portions so-joined.

NATHAN M. STANLEY.